United States Patent Office 3,141,470
Patented July 21, 1964

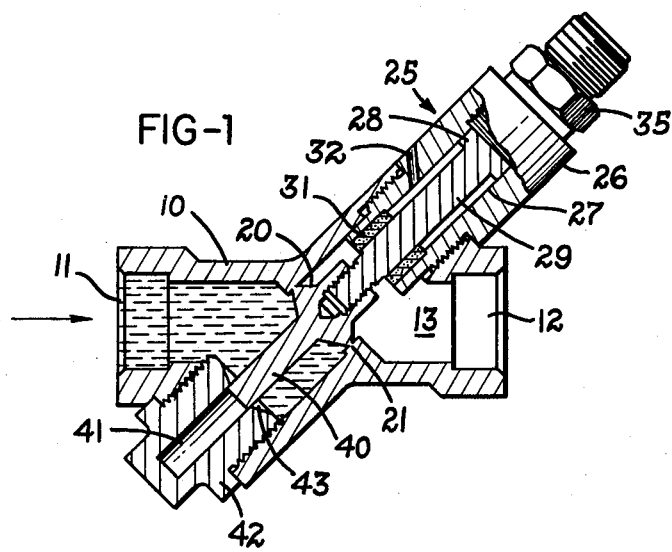
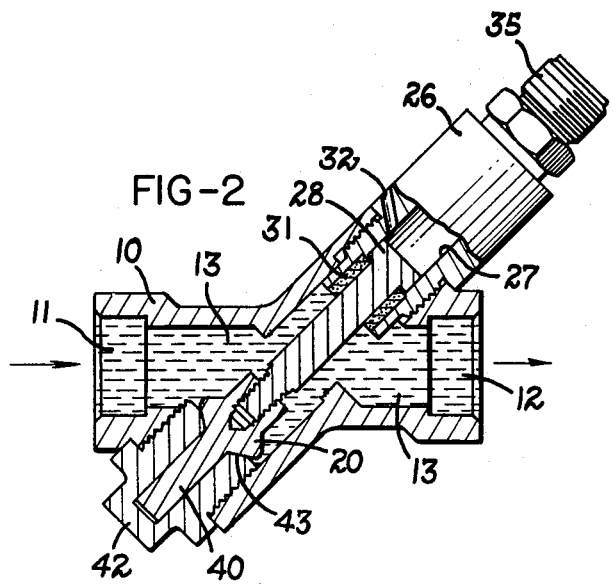

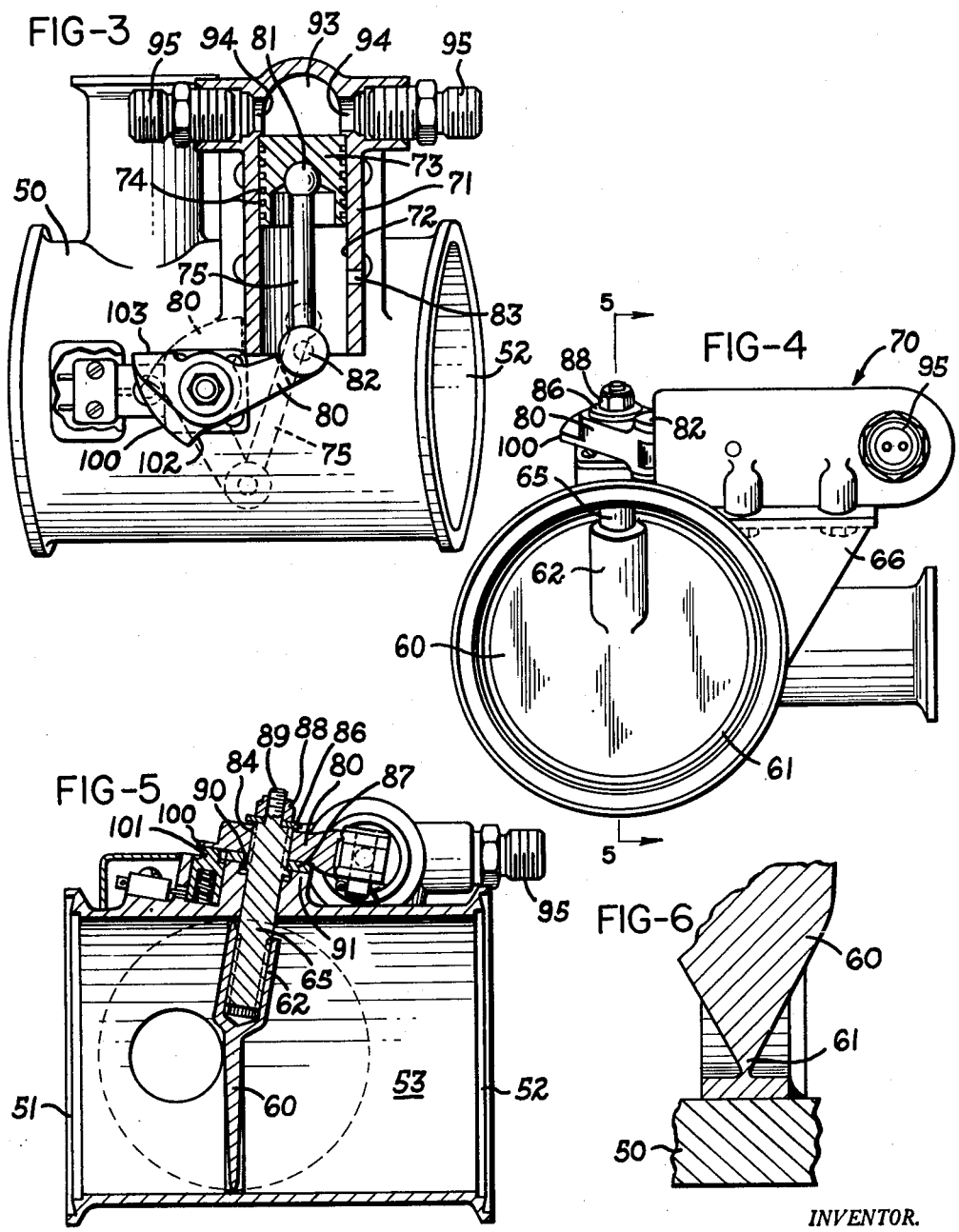

3,141,470
VALVE ASSEMBLY
Raymond H. LaFontaine, Dayton, Ohio, assignor to Koehler Aircraft Products Company, Dayton, Ohio, a corporation of Ohio
Filed Apr. 21, 1961, Ser. No. 104,585
2 Claims. (Cl. 137—68)

The present invention relates generally to valves and more particularly to a quick acting normally closed valve.

Numerous requirements for quick acting leakproof valves of the "single shot" or single acting type have developed in both private industry and in military weapons systems. For example, in the storage and handling of highly pressurized rocket liquid propellants, gases or cryogenic fluids, such as liquid hydrogen or oxygen, or in many aircraft fire extinguishers the valves must be absolutely leakproof as well as have the capability to open a flow path of an exact predetermined diameter within several milliseconds. These valves must not, in any manner, contaminate the fluid flowing therethrough when they are associated with highly sophisticated equipment which could be adversely affected by foreign elements in the fluid system. For example, minute sized particles in a flow stream will often clog a spray nozzle or present an unanticipated restriction in a flow line when trapped by a filter. Also, because the equipment utilizing such a valve is usually inactive for a substantial period of time before being utilized the valve must be relatively simple in construction in order to minimize the susceptibility to failure and need for maintenance.

Accordingly, one object of the present invention is to provide an improved valve which places an hermetically sealed barrier in the flow stream.

Another object of this invention resides in the provision of a valve which will not contaminate the fluid flowing therethrough.

Another object of this invention resides in the provision of a valve which does not present unanticipated restrictions in the flow stream.

Yet another object of the herein disclosed invention is to provide a valve of the single action type which is capable of controlling extremely high pressures.

A further object of the invention is to provide an absolutely leakproof valve which is simple in construction and capable of maintaining its reliability through long periods of storage.

Still another object of the present invention is to provide a valve which is capable of handling cryogenic or highly corrosive fluids without leakage or contamination of the fluids.

Other objects and advantages of the invention will be apparent from the following description, the accompanying drawings and the appended claims.

In the drawings:

FIG. 1 is a longitudinal section view of one embodiment of the present invention;

FIG. 2 is a view similar to FIG. 1 showing the valve in the open position;

FIG. 3 is a longitudinal view, partially in section, of another embodiment of the present invention;

FIG. 4 is an end view of the embodiment shown in FIG. 3;

FIG. 5 is a section view taken substantially along the line 5—5 of FIG. 4; and

FIG. 6 is a fragmentary sectional view of the flow preventing barrier for the embodiment of FIG. 3.

FIGS. 1 and 2 of the drawing illustrate one embodiment of the present invention wherein a valve housing or body 10 has a fluid inlet 11 and outlet 12 at the extreme ends of the conduit 13. Any number of conventional expedients can be utilized to connect the valve at its inlet and outlet ends in a fluid system, but no particular one of these expedients is herein disclosed as they do not form part of the present invention. The hermetically sealed flow barrier 20, prior to actuation of the valve, absolutely blocks the fluid conduit 13. The flow barrier 20 is formed as an integral part of the valve housing 10, as shown in FIGS. 1 and 2. Consequently, the flow barrier 20 will absolutely prevent fluid passage through the conduit 13 until the barrier is removed. In other words, this flow barrier does not have the leakage potential of most conventional valves. While the barrier 20 has been shown as being formed in the valve housing 10 by a machining operation, it is within the scope of this invention to secure the flow barrier 20 in the conduit 13 by a welding operation or by any equivalent mechanical arrangement. The barrier has a thin or frangible portion 21 at a predetermined section, for example near its outer periphery. This thin section 21 is naturally the weakest section between the flow barrier and the valve housing and when sufficient force is applied to the flow barrier 20 it will sever or break from the valve housing along this section.

A fluid motor 25 is secured to the valve by any conventional expedient, such as threading, as shown in FIGS. 1 and 2. The motor 25 includes a housing 26 having a cylindrical bore 27 therein. Piston 28 is mounted in the cylindrical bore 27 and is capable of moving axially therein. Piston rod 29 projects outwardly from the motor housing 26 and is rigidly secured in any conventional manner to the barrier 20. Seal or packing 31 is interposed between the piston rod 29 and the motor housing 26 to prevent the passage of the fluid in conduit 13 to the cylinder 27. More important, the seal 31 also prevents the fluid in the conduit 13 from being contaminated with the pressurized fluid utilized to actuate the piston 28. The seal 31 is constructed from materials which will maintain their seal characteristics under high pressure and extreme temperatures.

Port 32 relieves much of the pressure formed below the piston 28 as it moves downwardly. Once the piston 28 moves past the port 32, the pressure above the piston 28 is relieved thereby obviating the possibility that, over an extended period of time, pressurized fluid above the piston 28 will seep around the piston, past seal 31, and into the fluid stream with consequent contamination of the fluid flowing through the valve.

One end of the motor housing 26 is suitably threaded to receive an electrically actuated explosive squib 35 which, when exploded, generates sufficient gas pressure to drive the piston 28 downwardly. While an electrically actuated explosive squib has been shown, it is within the scope of this invention to utilize any equivalent high pressure generating means.

The opposite side of the flow barrier 20 has secured thereto a guide projection or rod 40. When the flow barrier is in the flow preventing position, as shown in FIG. 1, only the extreme end of projection 40 is inserted in the guide bore or cavity 41 which is formed in the guide plug 42. The guide plug 42 is securely mounted in the valve housing 10 by any conventional means such as threading, welding or a combination thereof. An internal chamfer 43 is formed at the open end of the guide bore 41 to facilitate in the assembly of the valve and to allow the barrier 20, when separated from housing 10, to fit closely with the plug 42 as shown in FIG. 2.

In operation, the valve is normally in the flow preventing position as shown in FIG. 1 wherein it absolutely blocks fluid flow and leakage through the conduit 13. That is, since the flow barrier 20 is formed integrally with the valve body 10 it is impossible for even highly pressurized fluids to seep through or around the barrier 20.

When it is desired to open the valve, thereby connecting the inlet 11 with the outlet 12, an electrical signal explodes the squib 35 generating a highly pressurized fluid in the cylinder 27 above piston 28. Of course, if such electrically actuated squib is not utilized, its equivalent is suitably actuated to generate this high pressure. The pressure fluid forces the piston 28, the piston rod 29, the flow barrier 20, and the guide projection 40 downwardly thereby shearing or otherwise severing the flow barrier 20 from the valve body 10.

The integral connection between the barrier and the valve severs at the weakest point, that being the thin section 21 around the outer periphery of the flow barrier 20, thereby permitting substantially unrestricted flow through conduit 13. Further, since the barrier separation takes place along the clearly defined line formed by the thin section 21 the possibility that small pieces of the barrier 20 or the housing 10 is substantially eliminated. Subsequent to the separation of the barrier and valve body, the guide projection 40 is driven into the bore 41 as shown in FIG. 2. This guide means insures that the severed barrier will be placed in an exact predetermined position at the termination of the valve opening operation. The projection 40 and the bore 41, when mated, form a sufficiently tight fit to prevent separation thereof, retaining the barrier 20 in the predetermined open position.

FIGS. 3–6 illustrate another embodiment of the present invention wherein the valve housing or body 50 has a fluid inlet 51 and an outlet 52. The valve housing is tubular in shape and defines a fluid conduit 53 which may interconnect the inlet 51 and the outlet 52. A hermetically sealed flow barrier 60 is interposed in the conduit 53 between the inlet 51 and the outlet 52, as shown best in FIG. 3. The flow barrier 60 is integrally connected with the valve housing 50 by forming it as a part thereof or by welding it into position as shown in FIG. 6. This flow barrier 60 has a relatively thin section 61 around or near its outer periphery. On one side of the flow barrier 60 is formed a bore housing 62 having internal splines therein suitable to receive the externally splined end of torque rod 65. The torque rod 65, when fitted in bore 62, forms a connection which enables the rod 65 to apply a torque to the barrier 60.

Bracket 66 is mounted on housing 50 and has secured thereto a fluid motor 70 which includes a housing 71 having a cylinder 72 formed therein. Piston 73 is suitably mounted in cylinder 72 and sealing rings 74 prevent any substantial fluid passage between the cylinder 72 and the piston 73. A piston rod 75 suitably interconnects the piston 73 with the lever 80 having pivot connections 81 and 82 with the piston 73 and lever 80, respectively. Once piston 73 moves to a position below the port 83 the gas pressure in the space above the piston is relieved. Lever 80 and torque rod 65 have a splined connection 84 therebetween, as shown best in FIG. 5. The lever 80 is clamped between washers 86 and 87 by fastening the nut 88 on the threaded end 89 of the torque rod 65. The washer 87 abuts the shoulder 90 on the torque rod 65, and also forms a bearing surface with that portion 91 of the housing surrounding rod 65. Thus, the connection between the lever 80 and the torque rod 65 is rigid and will not permit relative motion between these two parts. The linkage between the piston 73 and the torque rod 65 converts the linear motion of the piston 73 to rotary motion of the torque rod 65 and flow barrier 60.

A chamber 93 is formed at the upper portion of motor housing 71 and has substantially identical passageways 94 connecting the electrically actuated exploding squibs 95 therewith. Two squibs are used to insure proper operation of the valve should one squib fail to fire. It is again pointed out that any fluid pressure generating means capable of generating a high pressure can be utilized in place of the exploding squibs 95.

The lever 80 has a projection 100 which, when the valve is in the flow preventing position, maintains the spring biased detent 101 in a depressed position. Rotation of the lever to open the valve moves the projection 100 from above the detent 101, permitting it to extend and thereby prevent rotation of the valve back toward the flow preventing position. When actuated, the detent 101 extends to a position where it prevents counterclockwise rotation of the lever 80, as viewed in FIG. 3, when the surface 102 of the projection 100 passes over and contacts the detent 101.

In operation, the flow barrier 60, while in the flow preventing position, as shown in FIGS. 3–6, absolutely blocks the flow of fluid through the conduit 53. When it is desired to open the conduit one or both of the electrically actuated squibs 95 are exploded, thereby generating a highly pressurized gas which drives piston 73 downwardly, as viewed in FIG. 4. The initial movement of the piston 73 effects the separation of the flow barrier 60 from the valve housing 53. That is, the downward movement of the piston 73 effects clockwise rotation of the lever 80 and torque rod 65, thereby imparting a twisting action to the flow barrier 60 which effects separation of the barrier 60 from the housing 53 along the relatively thin section 61 around the periphery of the barrier 60. The thin section 61 permits the integral connection to be cleanly broken thereby substantially obviating the possibility of foreign particles entering the flow stream or the possibility of an unanticipated restriction in the flow path. Once separated from the valve housing 50, the barrier 60 is rotated 90° about the axis of the torque rod 65 and locked into position. Locking is attained when the surface 103 of projection 100 contacts the motor housing 71 as shown by the broken lines of FIG. 3, and the detent 101 extends to prohibit counterclockwise movement of the projection 100.

From the above description it is apparent that the described embodiment of the present invention each provide a quick acting hermetically sealed valve. The flow barriers in each embodiment have a relatively thin section along which the barrier is cleanly separated from the valve housing, thereby preventing contamination of the fluid flowing through the valve. In each embodiment the position of the flow barrier is at all times under the control of its actuating mechanism, thereby insuring operational dependability. Since initially the space above the motor pistons is relatively small, the initial force generated therein is relatively large and capable of effecting a quick snap-action severance of the integral connection. The simplicity of design and the minimum number of moving parts permits use of this invention in environments where consideration of reliability after years of storage and inaction are paramount.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A hermetically sealed valve comprising a tubular valve body having therein a fluid conduit for straight line fluid flow therethrough; said conduit having an inlet and an outlet at opposite ends thereof; a flow barrier interposed in said conduit at a predetermined angle to the axis of said conduit; said barrier movable from a flow preventing position wherein said inlet is hermetically sealed from said outlet to an open position wherein fluid flows smoothly through said conduit; an integral connection between said barrier and said valve body when said barrier is in said flow preventing position; fluid motor means for moving said barrier between said positions and including a cylinder secured to said body and having a piston reciprocally mounted therein; a piston rod rigidly interconnecting said piston and said barrier for effecting the rupture of the integral connection and for moving said barrier from said flow preventing position to said open position; a guide rod rigidly connected to said barrier and having a predetermined diameter; said barrier being thicker in the central portion thereof at the connections with said guide and piston rods with the thinnest section thereof being around the periphery of said barrier adjacent said body for insuring a clean separation therefrom; and means defining a guide bore in said valve body having a diameter slightly less than said predetermined diameter for receiving said rod during movement of said barrier to said open position thereby insuring proper positioning of said barrier in the open position and a press-fitted locking relationship therebetween to lock said barrier and said actuator means against movement once said barrier is moved to said open position; said bore having an internal chamfer around the entrance thereto corresponding to the shape of said barrier around said guide rod for closely accommodating said barrier in said open position; said cylinder, piston rod, guide rod and bore being coaxial with said predetermined axis of said barrier thereby permitting maximum unrestricted and uninterrupted flow through said conduit when said barrier is moved to said open position.

2. A hermetically sealed valve comprising a tubular valve body having therein a fluid conduit for straight line fluid flow therethrough; said conduit having an inlet and an outlet at opposite ends thereof; a flow barrier having an integral connection with said valve body and interposed in said conduit at a predetermined angle to the axis of said conduit, said barrier movable from a flow preventing position wherein said inlet is hermetically sealed from said outlet to an open position wherein fluid flows smoothly through said conduit; fluid motor means for moving said barrier between said positions and including a cylinder secured to said body and having a piston reciprocally mounted therein, a piston rod rigidly interconnecting said piston and said barrier for effecting the rupture of said integral connection between said barrier and said valve body and for moving said barrier from said flow preventing position to said open position; a guide rod of predetermined diameter having one end rigidly connected to said barrier; and means defining a guide bore in said valve body having a diameter slightly less than said predetermined diameter for receiving said rod in press-fitted locking relationship thereby insuring proper positioning of said barrier in the open position and locking of both said barrier and said actuator means against movement when said barrier is in said open position, said rod having its other end positioned in the entrance portion of said bore when said barrier is in said flow preventing position for guiding initial movement of said rod; said cylinder, piston rod, guide rod and bore being coaxial with the axis of said barrier to provide maximum uninterrupted flow through said conduit.

References Cited in the file of this patent
UNITED STATES PATENTS

| | | |
|---|---|---|
| 2,405,439 | Lubbock | Aug. 6, 1946 |
| 2,712,881 | Mathisen | July 12, 1955 |
| 2,972,998 | Detwiler | Feb. 28, 1961 |